(12) United States Patent
Rath et al.

(10) Patent No.: US 8,811,918 B2
(45) Date of Patent: Aug. 19, 2014

(54) DISTRIBUTION OF TRANSMIT SIGNAL TO MULTIPLE TRANSMIT ANTENNAS FOR REDUCTION OF MEASURED SPECIFIC ABSORPTION RATE

(75) Inventors: Kamlesh Rath, San Ramon, CA (US); Erik Stauffer, Mountain View, CA (US); Rishi Ranjan, Foster City, CA (US); Soumen Chakraborty, Bangalore (IN); Manish Airy, Bangalore (IN); Bertrand Hochwald, South Bend, IN (US); Robert Lorenz, Menlo Park, CA (US); Richard Compton, Portola Valley, CA (US); Rakesh Agrawal, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 46 days.

(21) Appl. No.: 13/305,032

(22) Filed: Nov. 28, 2011

(65) Prior Publication Data
US 2012/0142291 A1    Jun. 7, 2012

Related U.S. Application Data

(60) Provisional application No. 61/417,386, filed on Nov. 26, 2010.

(51) Int. Cl.
*H01Q 11/12* (2006.01)
*H04B 1/04* (2006.01)

(52) U.S. Cl.
USPC .......................... 455/117; 455/127.2

(58) Field of Classification Search
USPC ............... 455/117, 127.1, 127.2, 101, 103
See application file for complete search history.

(56) References Cited

U.S. PATENT DOCUMENTS

| | | | |
|---|---|---|---|
| 6,456,856 B1 * | 9/2002 | Werling et al. | 455/575.5 |
| 2003/0228875 A1 * | 12/2003 | Alapuranen | 455/522 |
| 2005/0124305 A1 * | 6/2005 | Stichelbout | 455/117 |
| 2007/0238496 A1 * | 10/2007 | Chung et al. | 455/575.7 |
| 2010/0279751 A1 * | 11/2010 | Pourseyed et al. | 455/575.7 |
| 2011/0050437 A1 * | 3/2011 | O'Neill et al. | 340/644 |
| 2012/0071195 A1 * | 3/2012 | Chakraborty et al. | 455/522 |

* cited by examiner

*Primary Examiner* — Nguyen Vo
(74) *Attorney, Agent, or Firm* — Sterne, Kessler, Goldstein & Fox P.L.L.C.

(57) ABSTRACT

Various embodiments of the present invention recognize at least two zones of operation for a communication device. In a first zone, which is sufficiently spaced away from a human head or body that SAR limits will be met, transmit power delivered to an antenna of a communication device may be maximized within any other constraints under which the communication device operates. In a second zone, which is not sufficiently spaced away from a human head or body, transmit power is redistributed such that SAR limitations are met without affecting the transmit power control loop of the communication device. For example, a second antenna physically disposed at a different location within the communication device may be used either instead of, or in addition to, the first transmit antenna in order that the SAR limits are met.

20 Claims, 5 Drawing Sheets

US 8,811,918 B2

DISTRIBUTION OF TRANSMIT SIGNAL TO MULTIPLE TRANSMIT ANTENNAS FOR REDUCTION OF MEASURED SPECIFIC ABSORPTION RATE

CROSS-REFERENCE TO RELATED APPLICATIONS

This non-provisional application claims the benefit of U.S. Provisional Application No. 61/417,386, filed 26 Nov. 2010, the entirety of which is hereby incorporated by reference.

FIELD OF THE INVENTION

The present invention relates generally to radio communications and more particularly relates to reducing the measured specific absorption rate.

BACKGROUND

The specific absorption rate (SAR) is a measure of a rate at which a human body absorbs energy when exposed to a radio frequency (RF) field. RF fields are created by many common devices, including mobile phones, smartphones, cellular phones and so on. The specific absorption rate measures the power absorbed per mass of tissue, and is typically measured in watts per kilogram (W/kg). The SAR may be averaged over the whole body, or over a small sample volume, such as 1 g of tissue.

Various regulatory bodies, such as the Federal Communications Commission (FCC) in the United States, and the European Committee for Electrotechnical Standardization (CENELEC) in the European Union, establish specific absorption rate limits for exposure to RF energy close to the human head. For example, the FCC requires that any mobile phones have a SAR level at or below 1.6 W/kg over a mass of 1 g of tissue. Similarly, CENELEC requires that mobile phones have a SAR level at or below 2 W/kg over a mass of 10 g of tissue.

The SAR of a device is typically tested using an anthropomorphic mannequin head that simulates a human head. Testing is performed by placing the device at various positions on both sides of the phantom head and measuring the SAR at each position. Further, testing is typically performed at the maximum transmit power of the device under test. For devices that do not transmit continuously, SAR testing averages duty cycles to determine the SAR of the device.

From a communications standpoint (and not considering battery life), it is typically advantageous to use more rather than less transmit power in order to successfully transmit information to a remotely located receiver. However, health concerns have resulted in regulatory standards that limit transmit power in handheld communication devices such that human exposure to RF radiation stays within the specified limits.

What is needed are methods and apparatus for reducing the amount of transmit power that is absorbed by humans using such devices in close proximity to themselves.

BRIEF DESCRIPTION OF THE DRAWINGS

Embodiments of the invention are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
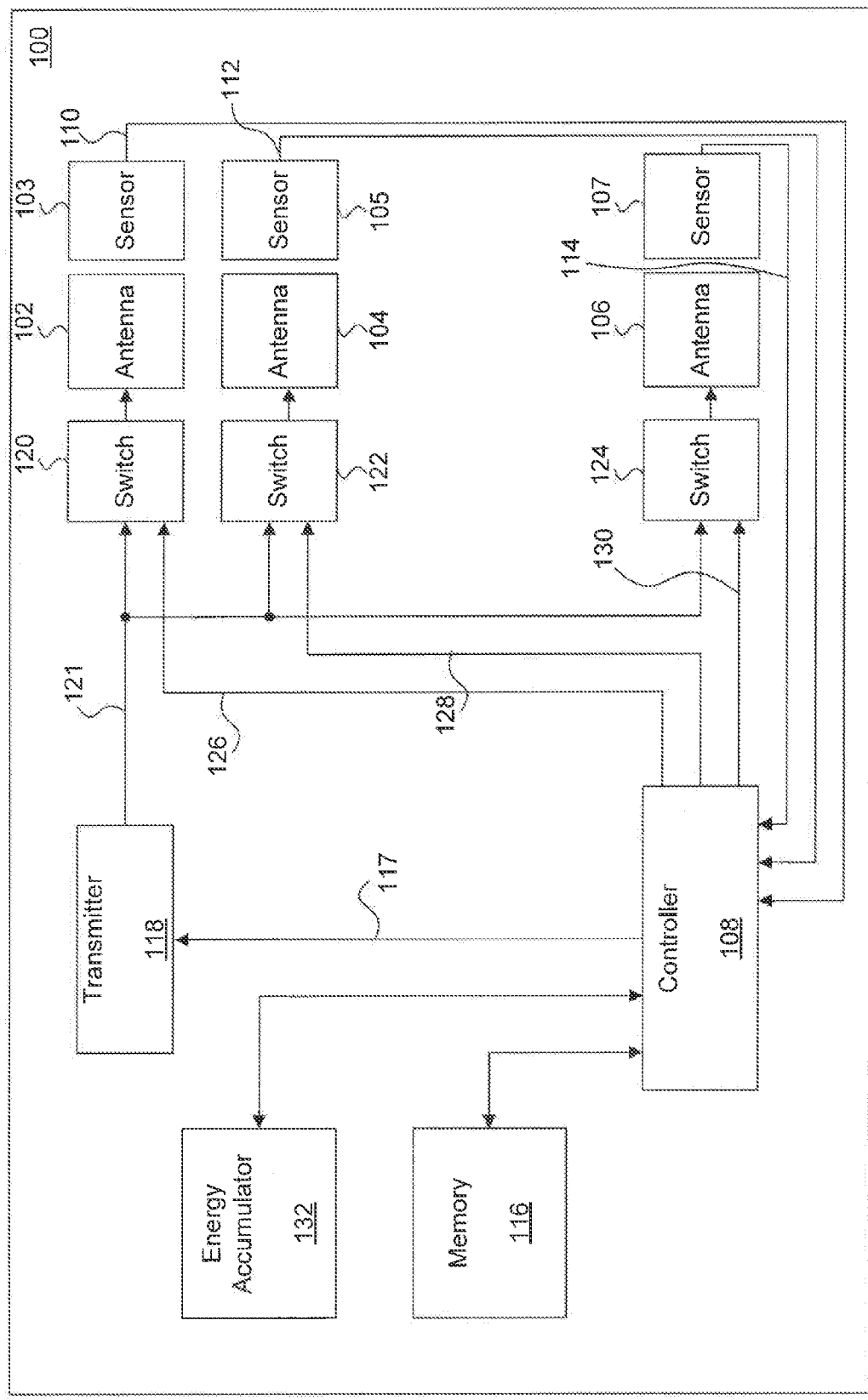
FIG. 1 is a block diagram of a communications device in accordance with the present invention.
Figure 2:
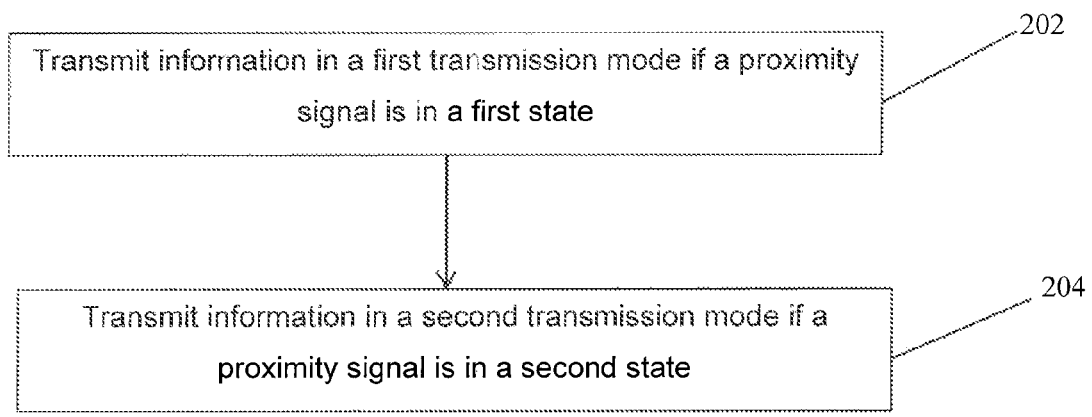
FIG. 2 is a flow diagram of a process of SAR mitigation in accordance with the present invention.

The following Detailed Description refers to accompanying drawings to illustrate exemplary embodiments consistent with the invention. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Terminology

The term "body" as used herein refers to the human body, including but not limited to the human head.

The terms, chip, die, integrated circuit, semiconductor device, and microelectronic device, are often used interchangeably in the field of electronics. The present invention is applicable to all the above as these terms are generally understood in the field.

With respect to chips, it is common that power, ground, and various signals may be coupled between them and other circuit elements via physical, electrically conductive connections. Such a point of connection may be referred to as an input, output, input/output (I/O), terminal, line, pin, pad, port, interface, or similar variants and combinations. Although connections between and amongst chips are commonly made by way of electrical conductors, those skilled in the art will appreciate that chips and other circuit elements may alternatively be coupled by way of optical, mechanical, magnetic, electrostatic, and electromagnetic interfaces.

The expression "communication device", as used herein refers generally to an electronic product that radiates RF power in proximity to a human user. Mobile phones, cellular phones, and smartphones are all examples of, but not necessarily limitations on, communication devices as that expression is used herein. The expression "mobile station" may be used as an alternative expression for communication device in the context of this disclosure.

The acronym CDD refers to Cyclic Delay Diversity.

The acronym FDD refers to Frequency Division Duplexing.

The acronym FET refers to a Field Effect Transistor.

The acronym IEEE refers to the Institute of Electrical and Electronics Engineers.

The acronym OFDMA refers to Orthogonal Frequency Division Multiple Access.

The acronym SAR refers to Specific Absorption Rate.

The acronym TDD refers to Time Division Duplexing.

The term "real-time" as used herein refers to actions, including but not limited to transmissions from a communication device, that cannot be delayed or rescheduled without noticeably affecting a quality of a service to those actions are directed. Actions that can be delayed or rescheduled are referred to as "non-real-time".

The expression "SAR-managed operation" refers to various methods in accordance with the present invention that are engaged when one or more proximity sensors of a communication device indicate that an active transmit antenna is within a predetermined range of a human body or head.

Overview

Ensuring that a transmitter in a communication device complies with SAR limitations raises multiple issues. For example, transmission at the edge of a cell typically requires a transmitter to operate at a high transmit power. Transmitting data at a high data rate also requires that the transmitter operate at a high transmit power. The power at which a transmitter transmits signals from a communication device, such as a cellular phone handset, or other device, directly affects the SAR of the communication device, which must always comply with SAR limits when placed close to a human head.

The power at which a transmitter transmits signals is typically controlled by a transmit power limit, which is determined by hardware and/or software of the communication device and may be based on several factors including, but not limited to, transmit channel characteristics, or the strength of transmitted signal as it is received at a base station. The transmit power limit may change over time responsive to changes in various conditions that affect the transmission from the communication device to the base station. In accordance with the present invention, this power control function operates independently of the SAR mitigation processes described below. In other words, the transmit power level may change even while the SAR mitigation processes are operating to reduce the measureable SAR.

One way to ensure compliance with SAR limits is to maintain the transmit power limit of a transmitter in a communication device at a low level. However, if the transmit power limit is too low, a base station communicating with the mobile station may receive or report errors, and data transmission may not be reliable. Maximizing the transmit power limit of a transmitter may ensure that the radio link between the communication device and the base station is reliable, as the transmitter may operate at a high transmit power. However, as explained above, maximizing the transmit power limit may have the effect of exceeding established SAR limits.

In view of the foregoing, various embodiments of the present invention, recognize at least two zones of operation for a communication device. In a first zone, which is sufficiently spaced away from a human head or body that SAR limits will be met, transmit power delivered to an antenna of a communication device may be maximized (within any other constraints under which the communication device operates). In a second zone, which is not sufficiently spaced away from a human head or body, transmit power is redistributed such that SAR limitations are met. For example, a second antenna physically disposed at a different location within the communication device may be used either instead of, or in addition to, the first transmit antenna in order that the SAR limits are met. Various exemplary embodiments are presented below to illustrate methods and apparatus in accordance with the present invention.

It is noted that re-allocation of transmit energy amongst various antennas of the communication device is accomplished without affecting the transmit power control functionality of the communication device.

In an alternative embodiment, total radiated transmit power is reduced by eliminating non-real-time transmissions made by a communication device. In this way, the total energy accumulated by a body in close proximity to the communication device over time may be within the SAR limits, even though certain real-time data transmissions take place at full allowable transmit power.

FIG. 1 is a high-level block diagram representation of a communication device 100 in accordance with the present invention. It is noted that such a communication device may include many other features and functions, but for the purposes of describing illustrative embodiments of the present invention only the relevant portions of a communication device are shown. More particularly, a first antenna 102 is disposed in communication device 100. A first proximity sensor 103 is disposed in communication device 100 such that it has a known spatial relationship to first antenna 102. A second antenna 104 and a second proximity sensor 105 are disposed in communication device 100 such that second antenna 104 and second proximity sensor 105 have a known spatial relationship. Likewise, an $n^{th}$ antenna 106 and an $n^{th}$ proximity sensor 107 are disposed in communication device 100 such that $n^{th}$ antenna 106 and $n^{th}$ proximity sensor 107 have a known spatial relationship to each other. Proximity sensors 103, 105, 107 are coupled to a controller 108 by signal paths 110, 112, 114 respectively, and each provides controller 108 with a signal indicating whether or not the antenna with which it is associated is within a predetermined range of a human head or body.

Still referring to FIG. 1, controller 108 is coupled to a memory 116. Memory 116 may be any suitable type or combination of types (e.g., volatile, dynamic, static, non-volatile, flash, read-only, fuse, anti-fuse, mask programmable) and may be of any suitable size. Size is typically expressed as a number of addressable locations, and the number of bits per addressable location. Memory 116 may have stored therein instructions for execution by controller 108 and/or data used during the operation of controller 108. In some embodiments, stored instructions (i.e., program code) are stored in a non-volatile memory such as a flash memory. It is noted that one or more values, such as but not limited to threshold values, may also be stored in a non-volatile memory such as flash memory. Flash memory is non-volatile but electrically reprogrammable, and thus can be updated. It is possible to construct embodiments of the present invention with read-only memory (ROM) for storage of program code and/or values, but while ROM is non-volatile, it cannot be reprogrammed or otherwise updated with new values. The present invention is not limited to any particular memory configuration.

Controller 108 is coupled to a transmitter 118, that is disposed within communication device 100. Controller 108 provides one or more control signals to transmitter 118 such that the transmission protocol, data, transmission power levels, modulation schemes, and so on, selected by controller 108 can be performed. Because controller 108 determines and controls the transmission power levels, which may vary over time, it provides the functionality of a transmit power controller, and it may, when the context is appropriate, be referred to as a transmit power controller. In various embodiments of the present invention, the operation of the transmit power controller is independent of SAR mitigation processes. Controller 108 is coupled to a first switchable circuit element 120, a second switchable element 122, and an $n^{th}$ switchable element 124. Switchable elements 120, 122, 124 are coupled to controller 108 by signal paths 126, 128, 130 respectively. By way of signal paths 126, 128, 130 controller 108 provides control signals to switchable elements 120, 122, 124. Switchable elements 120, 122, 124 are operable to either pass the transmit signal to, or block the transmit signal from, their associated antennas. By way of example and not limitation, a relay can perform this function. Likewise, a FET-based transfer gate can perform this function.

In connection with the pathway from transmitter 118 through switchable elements 120, 122, 124, and on to their associated antennas, those skilled in the art of circuit design will appreciate that there are a number of ways of implementing this functionality other than the relay and FET-based transfer gate mentioned above. It is noted that the present invention is not limited in any way to having a single power amplifier for transmission disposed before the switches, nor to an arrangement where the switches simply pass or block the transmit signal. For example, in a more generalized description of the present invention, the transmit signals may be switched electronically. Such an arrangement allows the transmit signal to be switched on a per frequency basis, in addition to switching the whole band. In various embodiments a power amplifier may be part of transmitter 118, and in other embodiments a power amplifier may be disposed after each of the electronic switches. The present invention is not limited by the position of a power amplifier, relative to the switching elements, in the pathway from the transmitter to an antenna.

In some embodiments controller 108 is a general purpose or special purpose processor. Controller 108 may be a microprocessor, a microcontroller, a digital signal processor, or any suitable type of circuitry that operates from a stored program to execute a particular computational or control task. In other embodiments, controller 108 includes logic circuits interconnected to perform one or more desired computational and/or control functions. The present invention is not limited to any particular implementation of controller 108 nor is it limited to any particular software, firmware or microcode content, combination or arrangement.

In various embodiments, transmitter 118 may be a WiMAX transmitter operating in accordance with the IEEE 802.16 family of standards, an LTE (Long Term Evolution) transmitter, a 3G (Third Generation) transmitter, a 4G (Fourth Generation) transmitter, or other type of transmitter. In one illustrative embodiment, a time division duplex configuration is used.

Proximity sensors 103, 105, 107 may be configured to determine the physical proximity of communication device 100 to a body. More particularly, proximity sensors 103, 105, 107 each produce a signal indicating whether the antenna with which it is associated is within a predetermined range of a body. Proximity sensors 103, 105, 107 may be of any suitable type, such as but not limited to, infrared, acoustic, capacitive, inductive or any combination thereof. Proximity sensors 103, 105, 107 typically convert energy from one form, such as but not limited to electromagnetic energy, into electrical energy.

Still referring to FIG. 1, an energy accumulator 132 is coupled to controller 108. Energy accumulator 132 receives one or more control signals from controller 108, and provides information to controller 108 relative to transmitted energy over a given time period. Energy accumulator 132 may be implemented in any suitable manner including but not limited to software, firmware, or microcode executed by controller 108. That is, the functionality of energy accumulator 132 may be implemented entirely within controller 108 in some embodiments of the present invention. Alternatively, energy accumulator 132 may be implemented entirely with hardwired circuitry rather than with program code. As described in more detail below, the function of energy accumulator 132 is to monitor the transmit power level over a predetermined period of time so that there is in effect a rolling window of the average transmitted power over a preceding predetermined amount of time. In some embodiments energy accumulator 132 is reset when communication device 100 is out of range (as determined by proximity sensors 103, 105, 107) of a body.

It is noted that one or more of the functional blocks of FIG. 1 may be formed on a single integrated circuit, or chip. The present invention is not limited to any particular form, layout, or partitioning between one or more chips or other components.

Various embodiments of the present invention provide SAR-management methods using multiple transmit antennas disposed in, and/or on, a communication device to reduce the amount of radiation that is measured during SAR testing. Various methods in accordance with the present invention manage SAR without reducing transmit power.

It is noted that typically regulatory SAR test measurements are averaged over a period of time over the surface of the communication device.

Since the amount of transmit energy absorbed by the body is related to the distance between the transmit source and that body, proximity sensors are used to determine whether the body is within a predetermined range of the communication device. In various embodiments of the present invention, multiple antennas of the communication device are used to spatially distribute the transmit signal in time and/or frequency.

It is further noted that SAR measurements are influenced by the duty cycle of transmission by the communication device. In view of the impact of duty cycle, some embodiments of the present invention enforce a limit on the duty cycle of transmission from the communication device.

Various embodiments of the present invention are activated when a proximity sensor of a communication device is triggered, i.e., the communication device responsively switches from normal transmit operation to SAR-managed operation. In typical embodiments, the communication device switches back to normal transmit operation once the proximity sensor trigger is removed. In various alternative embodiments, hysteresis is provided to avoid excessive switching between normal transmit operations and SAR-managed transmit operations.

During SAR-managed operation an estimate of the energy radiated by the communication device is continually accumulated. If at any point in time this accumulated estimate for radiated energy exceeds a predetermined threshold, one or more of the following SAR mitigation algorithms are performed. In other words, when a proximity threshold and an energy accumulation threshold are reached, then SAR mitigation processes take place.

It will be appreciated that various embodiments of the present invention may be implement with different numbers of antennas and/or proximity sensors. Several illustrative configurations and energy accumulation strategies are described below.

In an embodiment with one antenna and one proximity sensor, an estimate of the transmitted energy may be accumulated beginning in response to the proximity sensor being activated (i.e., tripped, or triggered). As will become apparent from the further descriptions below, when the accumulated value indicates that the SAR limit is, or will be exceeded, an additional SAR mitigation process, referred to as zero bandwidth request, may be engaged by the communication device.

In an embodiment with M antennas and one proximity sensor, an estimate of the transmitted energy, reduced by a factor X, is accumulated beginning in response to the proximity sensor being activated. In such a configuration factor X is typically 1/M. It is noted that the present invention is not limited any one particular factor, and the physical layout of the communication device may impact a designer's choice of a value for factor X.

In an embodiment with M antennas and N proximity sensors (where N>1), a separate estimate of the transmitted energy from each antenna, multiplied by an associated factor, is accumulated beginning in response to at least one of the N proximity sensors being activated. More particularly, for an antenna associated with a triggered proximity sensor the accumulation is performed with a factor Y, and for an antenna associated with a non-triggered proximity sensor the accumulation is performed with a factor Z. Factors Y and Z may depend of the physical layout (i.e., geometry) of the communication device and its components, but typically, Y=1 and Z=0. There are several cases to consider for such embodiments in terms of antenna selection. For example, in a first case where no proximity sensors have been triggered, a transmit antenna is selected such that $h_i$: $i^{\epsilon}\{1, \ldots, M\}$ is maximized, where $h_i$ is the channel from antenna, to the base station. In a second case, where some of the proximity sensors have been triggered, but not the sensor associated with the antenna that maximizes $h_i$: $i^{\epsilon}\{1, \ldots, M\}$, the transmit antenna that maximizes $h_i$: $i^{\epsilon}\{1, \ldots, M\}$ is selected. In a third case, where some of the proximity sensors including the one associated with the antenna maximizing $h_i$: $i^{\epsilon}\{1, \ldots, M\}$, a determination of the maximum power that can be transmitted from antenna i such that a factor W ($0 \leq W \leq 1$) of the SAR budget for transmit energy is spent on this antenna. Since there are still M−1 antennas in this configuration, the selecting process is repeated to find the antennas with the best link to the base station, and determining the maximum power that can be used for a given sensor state, SAR limit, and factor W. For the Alternate Frame Transmission mitigation process (described below), the power determined above defines the amount of time that can be allocated to each antenna. For the Tile Order Transmission mitigation process (described below), the power determined above defines the number of frequencies (tiles) that can be allocated per antenna. For the Cyclic Delay Diversity Transmission mitigation process (described below), the power determined above defines the power to be allocated to each antenna.

In some embodiments, antennas may share a proximity sensor. In such a configuration accumulation of the estimated transmit energy, multiplied by a factor is also performed. In this case the factor is typically 1/(number of antennas sharing the sensor).

Alternate Frame Transmission

In order to keep a communication device in conformance with SAR limitations, various embodiments of the present invention split the transmission time, and thus transmission energy, amongst two or more antennas. Typically, various embodiments perform this time-sharing of the transmission energy after a proximity sensor is activated. Over some period of time T, such embodiments of the present invention ensure that transmissions from each of the antennas occurs for a substantially equal period of time. In some embodiments, T corresponds to a period of time corresponding to an SAR test.

In some illustrative SAR mitigation processes in accordance with the present invention, the transmission of data is controlled such that each transmit antenna 102, 104, 106 on communication device 100 is used in alternate frames. In the case where communication device 100 has two transmit antennas, each of the two antennas is used for transmission during odd or even frames respectively. In communication devices with more than two transmit antennas, the transmission is scheduled in a round-robin manner on each transmit antenna.

In other illustrative SAR mitigation processes in accordance with the present invention, the transmission of data is controlled such that two or more transmit antennas of communication device 100 are used for radiating the transmission energy in a time division multiplexing fashion. That is, the antennas share transmission time, such that transmission may take place through one antenna at a time. While alternating transmission between odd and even frames is one way of doing this, it is noted that other suitable arrangements are possible. For example, various embodiments may use a first antenna to transmit two frames and then switch to a second antenna to transmit the following two frames. Various time division multiplexing arrangements can be used such that the transmit energy is divided, typically evenly, between the antennas over a predetermined length of time.

Once a proximity sensor (e.g., 103, 105, 107) is triggered, the SAR mitigation process redistributes the total radiated power amongst multiple spaced apart antennas, instead of the total radiated power being sent through a single antenna.

In some embodiments the transmitter 118, or transmitter 118 and controller 108 together, identify which antenna is the optimal one from which to transmit in terms of delivering the best signal to the remotely located base station. This identified antenna is then used to transmit to the base station. Various illustrative SAR mitigation processes blend usage of the optimal antenna and the suboptimal antenna. It is noted that this arrangement typically results in less power being received at the base station, and also has the problem of the received power at the base station fluctuating if there is antenna imbalance, and can adversely affect the system's power control.

In this SAR mitigation process, and where there is only one proximity sensor, the energy accumulator typically accumulates 50% of the total energy for comparison with SAR limits if the antennas are sufficiently spaced apart.

Tile Order Transmission

The Tile Order transmission SAR mitigation method splits the transmit signal among multiple transmit antennas. This can be done for the OFDMA transmit signal by dividing the OFDMA sub-carriers into tiles, or resource blocks, that can then be scheduled/assigned to different transmit antennas. In WiMAX, for example, 210 tiles are used to divide the uplink signal across frequency.

The transmitted signal may be split among the multiple transmit antennas equally. For example, even tiles might be routed to one antenna and odd tiles routed to another antenna. Alternatively, the tiles may be split unequally among the transmit antennas in such a way that the tiles are routed to the antenna with the lowest path-loss whenever possible, while insuring that the SAR limit is not exceeded by any particular transmit antenna.

In some embodiments the transmitter 118, or transmitter 118 and controller 108, identify which antenna is the optimum one from which to transmit. This selection may be performed on a frequency tile by tile basis. In the case where there is only one proximity sensor, this SAR mitigation process should only be selected if the energy transmitted on each antenna is approximately equal.

In this SAR mitigation process, and where there is only one proximity sensor, the energy accumulator typically accumulates 50% of the total energy for comparison with SAR limits if the antennas are sufficiently spaced apart. If the transmit power is not evenly split, then the energy accumulator accumulates the energy for the antenna transmitting more power.

In the various illustrative embodiments disclosed herein, controller 108 directs the distribution, or splitting, of the transmit signal amongst the various antennas.

This method can be used with other methods described herein to reduce the measured SAR.

Proximity Antenna Selection

The proximity antenna selection SAR mitigation method uses multiple proximity sensors, each physically located close to an associated transmit antenna in a known spatial relationship therewith. Each antenna is capable of independent SAR-managed operation. Thus, if one or more of the proximity sensors trigger, then the SAR mitigation process ensures the corresponding transmit antennas are not selected for uplink transmission (i.e., the antenna associated with the proximity trigger is de-selected for transmission).

In the various illustrative embodiments disclosed herein, controller 108 directs the de-selection of antennas and the redistribution of the transmit signal to one or more other antennas of the communication device.

The transmit antenna(s) selected for transmission can be used with one of the other methods described herein to further reduce the radiated power and maintain operation within SAR limits.

In this SAR mitigation process, the energy accumulator accumulates a percentage of the total energy for comparison with the SAR limits if only one proximity sensor is triggered. The percentage depends on how far apart the antennas are located. If each of the proximity sensors is triggered, then 100% of the total energy should be accumulated.

Stopping Grants for Non-Real-Time Services Using Zero Bandwidth Request

Radio networks employing a centralized scheduler may rely on bandwidth requests from devices to grant uplink allocations. In accordance with an alternative embodiment of the present invention, a zero bandwidth request technique is used to stop uplink allocation for non-real-time service flows in order to reduce transmit power from the communication device, when the total transmitted energy over a given period of time would violate the SAR limit if the non-real-time service was allocated transmission bandwidth. Such a zero bandwidth request may also be referred to as a null bandwidth request.

In one illustrative embodiment, the communication device keeps a running average of total energy transmitted and triggers zero bandwidth request for all non-real time service flows if the total energy transmission can potentially violate the SAR limit.

It is noted that there is some delay associated with a base station receiving zero bandwidth requests and the stopping of bandwidth allocation by the base station scheduler. It is further noted that the communication device is typically required to transmit control data such as, for example, channel quality information, HARQ ACK/NACK for DL data, ARQ feedback for DL data, and the like. Various embodiments take into account the scheduling delay for the base station and the power transmitted due to control message transmissions during this delay period.

The communication device sends zero bandwidth requests early enough to ensure that the SAR limit is not violated due to allocations received during this scheduling delay and transmission of control messages.

This SAR mitigation process should be selected when the transmitted energy is over the SAR limit even after one or more other SAR mitigation processes have been engaged.

The energy accumulator should not accumulate energy in the sub-frames where there is no transmission. That is, no energy needs to be accumulated whenever the transmitter is not transmitting.

In the various illustrative embodiments disclosed herein, controller 108 determines when to transmit zero bandwidth requests for non-real-time service requests based at least in part on the amount of energy transmitted over a previous time period of predetermined length, and the amount of energy required for transmitting control data occurring during a length of time corresponding to a delay between transmitting a zero bandwidth request to a base station and the base station, responsive to the zero bandwidth request, ceasing the allocation of uplink bandwidth.

Cyclic Delay Diversity Transmission

The CDD transmission SAR mitigation method splits the transmit signal among multiple transmit antennas. CDD is a transmission technique that utilizes more than one transmitter by transmitting cyclically shifted copies of a signal. The cyclic shift is performed in the time domain, before the application of a cyclic prefix. Each transmitter is assumed to use the same transmit power. Given an OFDM system with $N_{FFT}$ points in the FFT (tones), a time domain cyclic shift is equivalent to a phase shift of $$e^{j\frac{2\pi k \delta}{N_{FFT}}}$$

on the $k^{th}$ tone for a cyclic shift of $\delta_{OFDM}$ samples. At the receiver, these duplicate signal copies appear simply as multipath. The multi-path causes constructive and destructive interference at different frequencies. So CDD gives diversity gain; and splitting power equally between the two antennas helps in SAR mitigation.

In one illustrative embodiment of the present invention a communication device includes a plurality of antennas disposed within the communication device; a transmitter, disposed within the communication device, and switchably coupled to the plurality of antennas; at least one proximity sensor, disposed within the communication device, a first one of the at least one proximity sensors having a known spaced apart relationship with at least a first antenna of the plurality of antennas; a controller, disposed within the communication device, and coupled to the transmitter and to the at least one proximity sensor; wherein the controller is operable, responsive to a first signal received from the at least one proximity sensor, to direct transmit power to the first antenna, and responsive to a second signal received from the at least one proximity sensor, to direct transmit power to at least a second antenna of the plurality of antennas.

In some embodiments each one of two or more of the plurality of antennas is associated with a proximity sensor. In various embodiments, the communication device is a mobile phone or a smartphone, but the present invention is not limited to these exemplary embodiments.

As noted above, from a communications standpoint, it is typically advantageous to use more rather than less transmit power in order to successfully transmit information to a remotely located receiver. However, health concerns have resulted in regulatory standards that limit transmit power in handheld communication devices such that human exposure to RF radiation stays within the specified limits. Various embodiments of the present invention recognize the proximity of a human body, or head, and may choose a sub-optimal communications link in order to provide improved health and safety with respect to human exposure to RF energy. Once a communication device in accordance with the present invention is spaced apart from a user by a predetermined distance, transmit operations return to a mode wherein transmit energy may be directed to a single antenna in order to produce a more effective communication link.

In one embodiment, a method of operating a communication device includes transmitting 202 information in a first transmission mode if a proximity signal is in a first state; and transmitting 204 information in a second transmission mode if the proximity signal is in a second state. In some embodiments the first transmission mode includes transmitting from a first antenna, and transmitting at a power level determined by a transmit power controller of the communication device; and the second transmission mode includes transmitting from one or more antennas, and transmitting at the power level determined by the transmit power controller, wherein the power level determined by the transmit power controller may vary over time. In some embodiments the second transmission mode includes transmitting from at least one antenna that is spaced apart from the first antenna. In various embodiments the proximity signal is generated by a proximity sensor having a known spatial relationship to the first antenna. In typical embodiments of the present invention, the proximity sensor, the first antenna, and the at least one of the one or more antennas are all disposed within a housing of the communications device. The present invention is not limited to a communication device having any particular form factor or set of functions. In one illustrative embodiment the communication device is a mobile phone. In another illustrative embodiment the communication device is a smart phone.

Figure 3:
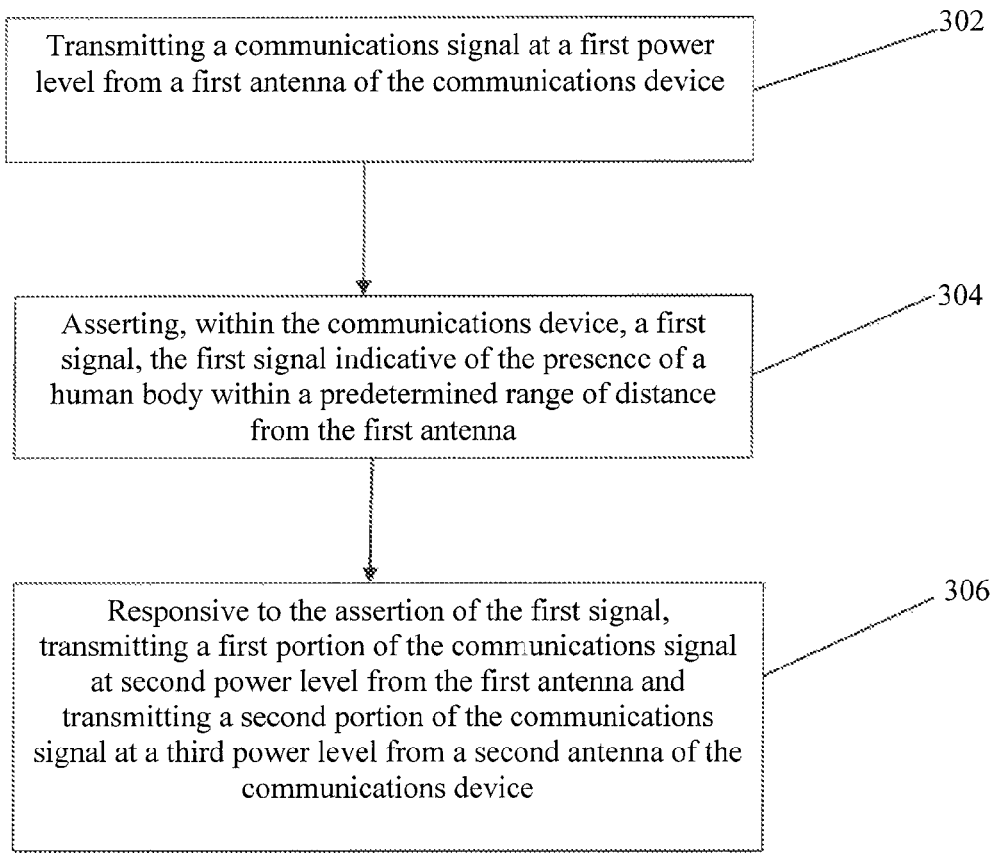
FIG. 3 is a flow diagram of an alternative process of SAR mitigation in accordance with the present invention.

Referring to FIG. 3, an illustrative method of modifying a spatial distribution of transmit power from a communications device includes transmitting 302 a communications signal at a first power level from a first antenna of the communications device; asserting 304, within the communications device, a first signal, the first signal indicative of the presence of a human body within a predetermined range of distance from the first antenna; and responsive to the assertion of the first signal, transmitting 306 a first portion of the communications signal at second power level from the first antenna and transmitting a second portion of the communications signal at a third power level from a second antenna of the communications device. n various embodiments, the first power level plus the second power level are substantially equal to the first power level. The first antenna and the second antennas are spaced apart from each other.

Figure 4:
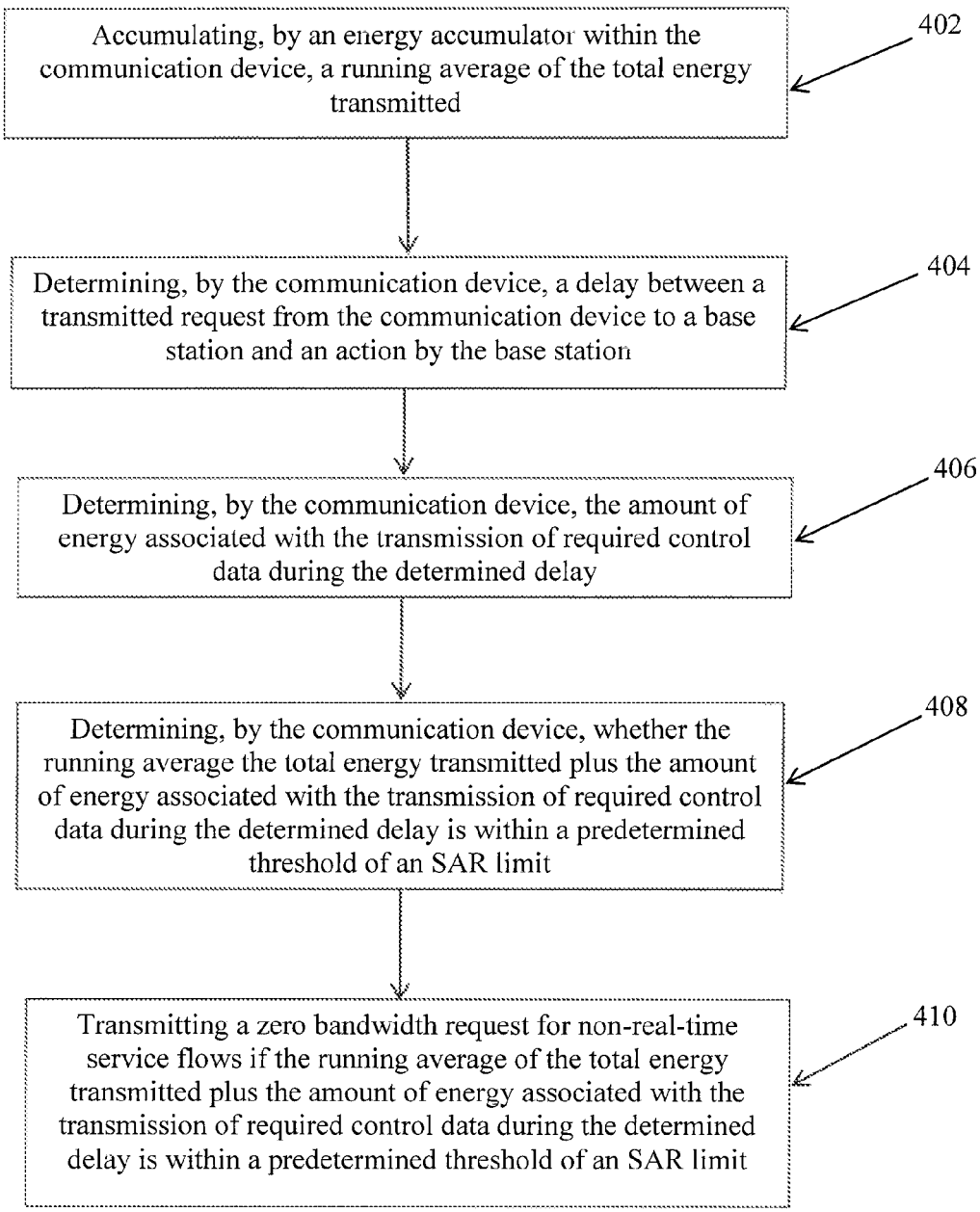
FIG. 4 is a flow diagram of an alternative process of SAR mitigation in accordance with the present invention.

Referring to FIG. 4, another illustrative method of reducing total transmit power to maintain operation within SAR limits includes accumulating 402, by an energy accumulator within the communication device, a running average of the total energy transmitted; determining 404, by the communication device, a delay between a transmitted request from the communication device to a base station and an action by the base station; determining 406, by the communication device, the amount of energy associated with the transmission of required control data during the determined delay; determining 408, by the communication device, whether the running average of the total energy transmitted plus the amount of energy associated with the transmission of required control data during the determined delay is within a predetermined threshold of an SAR limit; and transmitting 410 a zero bandwidth request for non-real-time service flows if the running average of the total energy transmitted plus the amount of energy associated with the transmission of required control data during the determined delay is within a predetermined threshold of an SAR limit.

Figure 5:
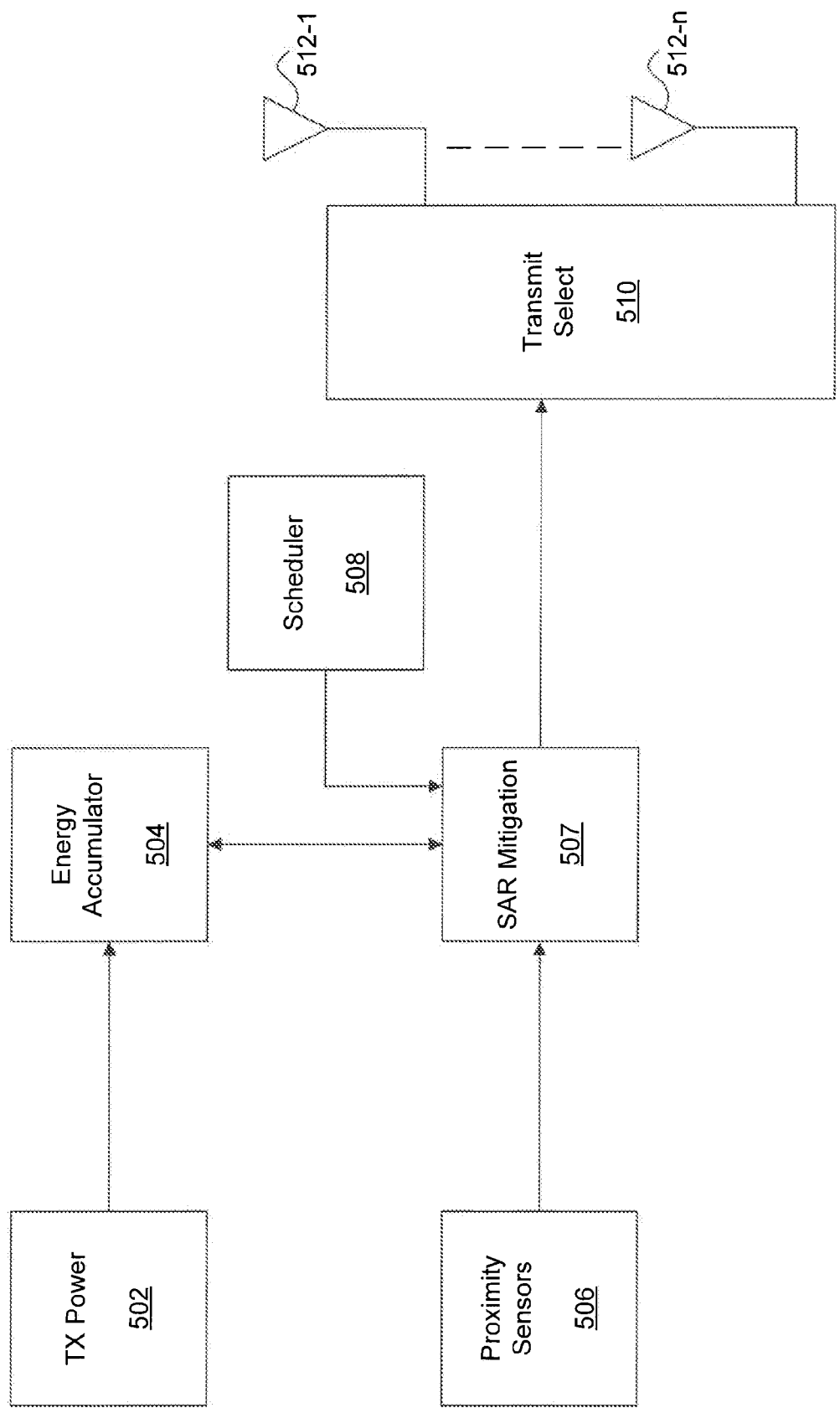
FIG. 5 is a block diagram illustrating various logical and control functions in accordance with the present invention.

FIG. 5 is a high-level block diagram showing a conceptual partitioning of the various functional blocks of an illustrative communication device in accordance with the present invention. A transmit power block 502 is coupled to an energy accumulator block 504. One or more proximity sensors 506 are coupled to an SAR mitigation block 507. SAR mitigation block 507 is further coupled to energy accumulator 504 and to a scheduler 508. Scheduler 508 is further coupled to energy accumulator 504. SAR mitigation block 507 is coupled to a transmit select block 510 which in turn is coupled to antennas 512-1 through 512-n. SAR mitigation block 507 uses, among other things, input from the proximity sensor block 506 to determines if SAR should be mitigated. That is, at a minimum, the communication device must be within a predetermined distance of a body before SAR mitigation processes are engaged. Energy accumulator block 504 accumulates and outputs information specifying the amount of energy transmitted by the communication device over an SAR accumulation window. Transmit power block 502 is the transmit power control for the communication device. The output of transmit power block 502 is used by energy accumulator block 504. Scheduler 508 indicates the future transmission schedule to SAR mitigation block 507. Transmit select block 510 select which antenna to transmit which frequency from at which time.

Various embodiments of the present invention find application in at least the field of wireless communication devices, including but not limited to, communication devices operating in TDD or FDD modes.

CONCLUSION

It is to be appreciated that the Detailed Description section, and not the Abstract of the Disclosure, is intended to be used to interpret the claims. The Abstract of the Disclosure may set forth one or more, but not all, exemplary embodiments of the invention, and thus, is not intended to limit the invention and the subjoined Claims in any way.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the subjoined Claims and their equivalents.

What is claimed is:

1. A method of operating a communication device, comprising:
transmitting information, by the communication device, in a first transmission mode if a proximity signal is in a first state; and
transmitting information, by the communication device, in a second transmission mode if the proximity signal is in a second state;
wherein the first transmission mode produces a transmit signal having a first duty cycle and includes transmission of non-real-time information, and the second transmission mode produces a transmit signal having a second duty cycle that is different from the first duty cycle and excludes transmission of non-real-time information.

2. The method of claim 1, wherein:
the first transmission mode comprises transmitting from a first antenna, and transmitting at a power level determined by a transmit power controller; and
the second transmission mode comprises transmitting from one or more antennas, and transmitting at the power level determined by the transmit power controller;
wherein the power level determined by the transmit power controller may vary over time.

3. The method of claim 2, wherein the second transmission mode comprises transmitting from at least one antenna that is spaced apart from the first antenna.

4. The method of claim 2, wherein the proximity signal is generated by a proximity sensor having a known spatial relationship to the first antenna.

5. The method of claim 4, wherein the proximity sensor, the first antenna, and the one or more antennas are all disposed within a housing of the communication device.

6. The method of claim 2, wherein transmitting from the first antenna comprises providing a first control signal from the transmit power controller to a first switchable element to electrically couple a transmit signal to the first antenna.

7. The method of claim 6, further comprising providing a second control signal from the controller to a second switchable element to prevent the transmit signal from reaching a second antenna of the one or more antennas.

8. The method of claim 2, wherein transmitting from one or more antennas comprises providing a first control signal from the controller to a first switchable element to electrically couple a transmit signal to the first antenna, and providing a second control signal from the controller to a second switchable element to couple the transmit signal at least a second antenna of the one or more antennas.

9. A method of modifying a spatial distribution of transmit power from a communications device having a plurality of transmit antennas, comprising:
transmitting, if none of the of transmit antennas is within a predetermined range of a human body, a communications signal from a first one of the plurality of transmit antennas in accordance with a first transmission arrangement; and
transmitting, if at least one of the plurality of transmit antennas is within a predetermined range of the human body, at least a portion of the communications signal from one or more additional antennas of the plurality of transmit antennas in accordance with a second transmission arrangement;
wherein the first transmission arrangement produces a transmit signal having a first duty cycle and includes transmission of non-real-time information, and the second transmission arrangement produces a transmit signal having a second duty cycle that is different from the first duty cycle and excludes transmission of non-real-time information.

10. The method of claim 9, wherein the first transmission arrangement comprises transmitting from a first antenna of the plurality of transmit antennas at a power level determined by a transmit power controller; wherein the second transmission arrangement comprises selecting a set of antennas from the plurality of transmit antennas, and transmitting from the selected set of antennas at a power level determined by the transmit power controller; and wherein the power level may vary over time.

11. The method of claim 10, wherein selecting the set of antennas comprises:
selecting, when no proximity sensors have been triggered, a transmit antenna that maximizes a link to a base station;
selecting, when at least one proximity sensor has been triggered and the at least one triggered proximity sensors are not associated with the transmit antenna that maximizes the link to the base station, the transmit antenna that maximizes the link to the base station; and
selecting, when at least one proximity sensor has been triggered and the at least one triggered proximity sensors are associated with the transmit antenna that maximizes the link to the base station, the antennas with the best link to the base station and determining the amount of power that can be transmitted through each antenna within an SAR power budget.

12. The method of claim 10, wherein the second transmission arrangement comprises at least one SAR mitigation process selected from the group consisting of Alternate Frame Transmission, Tile Order Transmission, and Cyclic Delay Diversity Transmission.

13. The method of claim 9, further comprising performing, in the second transmission arrangement, a Zero Bandwidth Request SAR mitigation process.

14. The method of claim 9, wherein transmitting a communications signal from a first one of the plurality of antennas comprises providing a first control signal to a first switchable element disposed between a transmitter and the first one of the plurality of antennas.

15. The method of claim 14, wherein transmitting at least a portion of the communications signal from one or more additional antennas comprises providing a second control signal to a second switchable element disposed between the transmitter and a second one of the plurality of antennas.

16. The method of claim 15, wherein providing the first and second control signals comprises generating the first and second control signals by a controller disposed within the communications device.

17. A communication device, comprising:
a plurality of antennas disposed within the communication device;
a transmitter, disposed within the communication device, and switchably coupled to the plurality of antennas;
at least one proximity sensor, disposed within the communication device, a first one of the at least one proximity sensors having a known spatial relationship with at least a first antenna of the plurality of antennas; and
a controller, disposed within the communication device, and coupled to the transmitter and to the at least one proximity sensor;

wherein the controller, responsive to a first state of a first signal received from the at least one proximity sensor, is configured to direct transmit power to the first antenna, and to provide transmission of non-real-time information responsive to a second state of the first signal, is configured to direct transmit power to at least a second antenna of the plurality of antennas, and to prevent transmission of non-real-time information, and responsive to a state transition of the first signal, is configured to wait a predetermined time before directing transmit power to either the first antenna or the second antennal.

18. The communication device of claim 17, wherein each one of two or more of the plurality of antennas is associated with a proximity sensor.

19. The communication device of claim 17, further comprising:
an energy accumulator coupled to the controller;
wherein the energy accumulator is configured to monitor the transmit power of the communication device.

20. The communication device of claim 17, Wherein the transmitter is switchably coupled to the plurality of antennas through a corresponding plurality of field effect transistor (FET)-based transfer gates, each transfer gate coupled to the controller.

* * * * *

UNITED STATES PATENT AND TRADEMARK OFFICE
CERTIFICATE OF CORRECTION

PATENT NO.       : 8,811,918 B2                                           Page 1 of 1
APPLICATION NO.  : 13/305032
DATED            : August 19, 2014
INVENTOR(S)      : Rath et al.

It is certified that error appears in the above-identified patent and that said Letters Patent is hereby corrected as shown below:

In the Claims

Column 13, line 57, please replace "none of the of" with --none of the plurality of--
Column 15, line 20, please replace "claim 17, Wherein" with --claim 17, wherein--

Signed and Sealed this
Twenty-first Day of October, 2014

Michelle K. Lee
*Deputy Director of the United States Patent and Trademark Office*